(12) United States Patent  (10) Patent No.: US 8,352,679 B2
Wolfe et al.  (45) Date of Patent: Jan. 8, 2013

(54) SELECTIVELY SECURING DATA AND/OR ERASING SECURE DATA CACHES RESPONSIVE TO SECURITY COMPROMISING CONDITIONS

(75) Inventors: Andrew Wolfe, Los Gatos, CA (US); Thomas Martin Conte, Atlanta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 590 days.

(21) Appl. No.: 12/432,599

(22) Filed: Apr. 29, 2009

(65) Prior Publication Data

US 2010/0281223 A1  Nov. 4, 2010

(51) Int. Cl.
G06F 12/00 (2006.01)
(52) U.S. Cl. .................... 711/118; 711/123; 711/162
(58) Field of Classification Search .............. 711/118, 711/162, 123
See application file for complete search history.

(56) References Cited

U.S. PATENT DOCUMENTS

| | | | |
|---|---|---|---|
| 4,780,905 A | 10/1988 | Cruts et al. | |
| 6,832,314 B1 | 12/2004 | Irvin | |
| 6,896,669 B2* | 5/2005 | Krautkramer et al. | 604/385.101 |
| 6,948,033 B2* | 9/2005 | Ninose et al. | 711/122 |
| 7,111,169 B2 | 9/2006 | Ripley et al. | |
| 7,181,572 B2* | 2/2007 | Walmsley | 711/128 |
| 7,305,562 B1* | 12/2007 | Bianco et al. | 713/186 |
| 7,337,328 B2 | 2/2008 | Evans | |
| 2003/0028699 A1 | 2/2003 | Holtzman et al. | |
| 2003/0145329 A1 | 7/2003 | Candelore | |
| 2003/0177386 A1 | 9/2003 | Cuomo et al. | |
| 2006/0080553 A1 | 4/2006 | Hall | |
| 2006/0129811 A1 | 6/2006 | Fiske | |
| 2006/0230234 A1 | 10/2006 | Bentolila et al. | |
| 2007/0038858 A1 | 2/2007 | Hughes | |
| 2007/0055893 A1 | 3/2007 | Dodd | |
| 2007/0101124 A1 | 5/2007 | Pitts | |
| 2007/0116267 A1 | 5/2007 | Speirs, II et al. | |
| 2007/0180239 A1 | 8/2007 | Fujibayashi et al. | |
| 2007/0245160 A1 | 10/2007 | Benhase et al. | |
| 2008/0040710 A1 | 2/2008 | Chiriac | |

(Continued)

FOREIGN PATENT DOCUMENTS

KR  1020060102584  9/2006

(Continued)

OTHER PUBLICATIONS

"International Search Report dated Dec. 10, 2010 regarding Application No. PCT/US2010/032817".

(Continued)

Primary Examiner — Son Dinh
(74) Attorney, Agent, or Firm — Dorsey & Whitney, LLP

(57) ABSTRACT

Techniques are generally described for methods, systems, data processing devices and computer readable media configured to decrypt data to be stored in a data cache when a particular condition indicative of user authentication or data security has occurred. The described techniques may also be arranged to terminate the storage of decrypted data in the cache when a particular condition that may compromise the security of the data is detected. The describe techniques may further be arranged to erase the decrypted data stored in the cache when a particular condition that may compromise the security of the data is detected.

20 Claims, 8 Drawing Sheets

U.S. PATENT DOCUMENTS

| | | |
|---|---|---|
| 2008/0208755 A1 | 8/2008 | Malcolm |
| 2008/0229118 A1 | 9/2008 | Kasako et al. |
| 2008/0232592 A1 | 9/2008 | Lee et al. |
| 2009/0119242 A1 | 5/2009 | Vargas Martin |
| 2010/0031062 A1 | 2/2010 | Nishihara et al. |
| 2010/0042832 A1 | 2/2010 | Fujibayashi et al. |
| 2010/0169683 A1 | 7/2010 | Wang et al. |
| 2010/0281247 A1 | 11/2010 | Wolfe et al. |
| 2010/0287383 A1 | 11/2010 | Conte et al. |
| 2010/0287385 A1 | 11/2010 | Conte et al. |

FOREIGN PATENT DOCUMENTS

| | | |
|---|---|---|
| KR | 10-2009-0019402 A | 2/2009 |
| WO | WO-2008/044837 A1 | 4/2008 |

OTHER PUBLICATIONS

Shannon, "A Mathematical Theory of Communication", Bell System Technical Journal, vol. 27, Jul., Oct., 1948, pp. 379-423, 623-656.

\* cited by examiner

500 Computer Program Product

502 Computer Readable Medium 504 at least one of 506 one or more instructions for configuring the processing unit to detect a condition indication that the security of data stored in a data cache may be compromised;

508 one or more instructions for configuring the processing unit to configure the processing unit to erase the data stored in the cache in response to detecting the condition.

FIGURE 11

SELECTIVELY SECURING DATA AND/OR ERASING SECURE DATA CACHES RESPONSIVE TO SECURITY COMPROMISING CONDITIONS

BACKGROUND

Data stored and transmitted electronically is vulnerable to theft Data storage devices, such as hard drives, flash drives, compact disks, memory chips and the like, whether portable or built into a computing device, are vulnerable to unauthorized remote access or the data being intercepted in transmission (i.e., "hacking") if linked to a network. Data storage devices are also vulnerable to theft of the physical device.

One widely used means for preventing data theft is to store data in an encrypted format unreadable by unauthorized users. Such methods usually involve transforming the data with some sort of encryption algorithm. To read the encrypted data, a decryption key or algorithm must be used. Access to the decryption key or algorithm is typically limited to authorized users. Although encryption can protect data in many cases, one remaining vulnerability involves data stored by a data processing device such as a server or desktop computer in a cache. More specifically, if secure data is stored in a server or other bulk data storage devices, known as "backing storage," access of the data is relatively slow compared to the data processing speed of the central processing unit (CPU) of modern computing devices. A solution to this is a cache, in which frequently retrieved data from backing storage devices is copied by the CPU and stored in main memory (i.e., in random access memory (RAM)) or in some other near-term storage such as flash memory. Alternatively, data from a server can be cached on local storage including hard drives or solid-state drives. Since cache copies are intended to be accessed quickly, they are often in unencrypted form even if the original copy was encrypted. However, data stored in the cache can be accessed like any other data on backing storage devices, and is thus likewise vulnerable to theft. Moreover, it is a copy of the most frequently accessed data from backing storage, which may be the most sensitive data stored on the backing storage device.

BRIEF DESCRIPTION OF THE FIGURES

The foregoing and other features will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 11 shows an example of any computer readable medium that stores instructions to configure a processing unit to detect conditions indicating that the security of data stored in a data cache may be compromised and to erase the data stored in the cache in response to detecting the condition, all arranged in accordance with the present disclosure.

DETAILED DESCRIPTION

Figure 1:
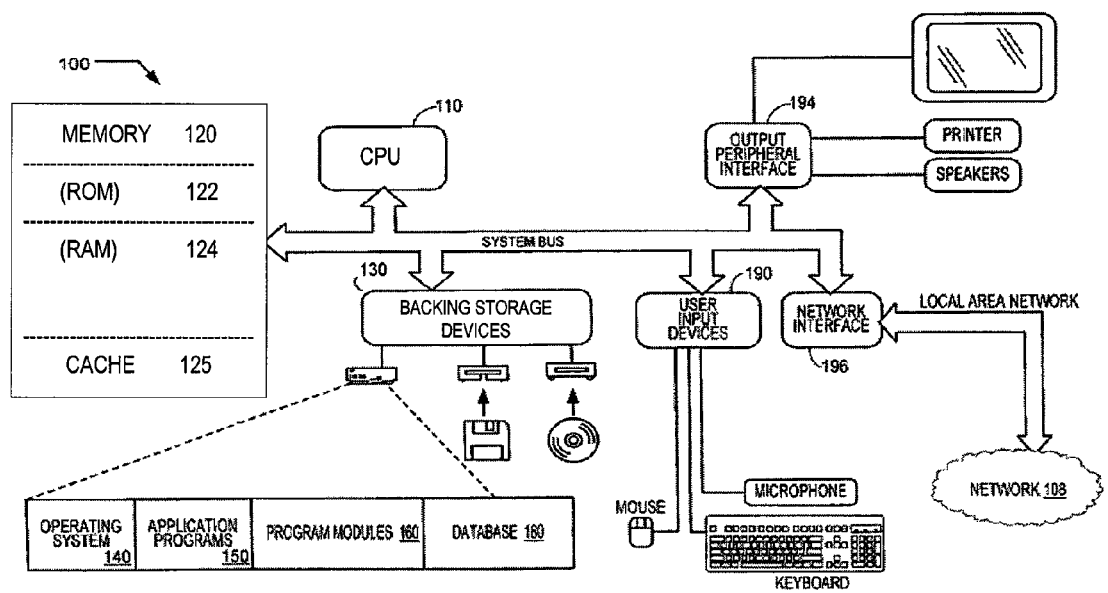
FIG. 1 is a block diagram of a typical computer in which the method for securing data and/or erasing secure data caches may be used.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly and implicitly contemplated and made part of this disclosure.

Described herein, inter alia, are methods, apparatus, computer programs and systems related to securing data. Examples provided herein thus may be used for providing security against reading of data in a cache by unauthorized users. In various examples, the method may run continually. Continually may include running at regular intervals, or when predetermined processes occur. In various examples, hardware and software systems and methods are disclosed. There are various vehicles by which processes and/or systems and/or other technologies described herein may be effected (e.g., hardware, software, and/or firmware), and that the vehicle used in any given embodiment may vary within the context in which the processes and/or systems and/or other technologies are deployed.

Accordingly, systems and methods for securing data and/or erasing secure caches are provided. Various examples contemplated herein may encrypt data in the cache when the data has been analyzed and a decision to encrypt has been made. Such analysis may comprise determining whether the data was previously encrypted and thus is in an encrypted state. Data in the cache may be decrypted for data processing by an algorithm using a decryption key.

The native encryption routine may further be used to encrypt data when a particular condition indicative of user authentication or data security has occurred. Additionally, several examples contemplated herein may be arranged to terminate secure data storage and erase the encrypted data stored in the cache when a particular condition that may compromise the security of the data has occurred. For example secure data storage may be terminated and/or secure data may be erased when security credentials are compromised, such as, for example, when a computer may have lost contact with a network (an indication that a data processor may have been stolen) or an authorized user may no longer be using the computer.

In several examples described herein, secure data storage may be utilized when an authorized user has been verified by an identification process, such as radio frequency identification (RFID) cards, a biometric security device such as a thumbprint scan, a password entry, a smartcard reader, etc. In other examples described herein, secure data storage may be terminated and/or secure data stored in a data cache may be erased when authentication is lost, such as when a user authentication RFID card can no longer be read, the computer leaves a particular WiFi domain, a network connection is lost, files stored in cache have not recently been updated, etc. In still other examples, secure data storage may be terminated and/or secure data stored in a cache may be erased if re-authentication does not occur within a preset period or a preset period has lapsed since a prior user authentication has occurred.

Accordingly, FIG. 1 is a block diagram of an example of a typical computer 100 in which the method for securing data and/or erasing secure data caches may be used in accordance with the present disclosure. The computer 100 may include a central processing unit (CPU) or processor 110, a main memory 120 and one or more backing storage devices 130. The processor 110 may generally be of any desired configuration including but not limited to a microprocessor (µP), a microcontroller (µC), a digital signal processor (DSP), any combination thereof, or some other device. The processor 110 may include logic for executing program instructions as well as other functional blocks such as an arithmetic logic unit (ALU), a floating point unit (FPU), a digital signal processing (DSP) core, registers, accumulators, etc. The main memory 120, which may be any suitable form of memory including, but not limited to, volatile memory such as random access memory (RAM) 124, non-volatile memory such as read only memory (ROM) 122 and flash memory, data storage devices such as magnetic disk storage (e.g., hard disk drive or HDD), tape storage, optical storage (e.g., compact disk or CD, digital versatile disk or DVD), or other machine-readable storage mediums that may be removable, non-removable, volatile or non-volatile. The main memory 120, may contain, in RAM 124, a cache 125 in which frequently accessed data from the backing storage devices 130 is stored during computer operation. The data stored in the cache 125 may be unencrypted so that it can be quickly used by the processor 110 without the need to first decrypt the data. Similarly, the processor 110 can more quickly store data in the cache 125 if it does not need to first encrypt the data. The backing storage devices 130, and their associated computer storage media, provide storage of computer readable instructions, data structures, program modules and other data for the computer 100. Backing storage devices 130 may store an operating system 140, application programs 150, program modules 160, and database 180. The computer 100 further includes user input devices 190 through which a user may enter commands and data. Input devices can include an electronic digitizer, a microphone, a keyboard and pointing device, such as a mouse, trackball, touch pad or other device. Other input devices may include a joystick, game pad, satellite dish, scanner, or the like.

These and other input devices may be connected to the processor 110 through a user input interface that is coupled to a system bus, but may be connected by other interface and bus structures, such as a parallel port, game port or a universal serial bus (USB). Computers such as computer 100 may also include other peripheral output devices such as speakers, which may be connected through an output peripheral interface 194 or the like.

The computer 100 may operate in a networked environment using logical connections to one or more computers, such as a remote computer connected to network interface 196. The remote computer may be a personal computer, a server, a router, a network PC, a peer device or other common network node, and may include many or all of the elements described above, such as backing storage devices, relative to computer 100. Networking environments are commonplace in offices, enterprise-wide area networks (WAN), local area networks (LAN), intranets and the Internet. For example, the remote computer and/or backing storage device connected to the remote computer may comprise source data of data for storage in the data cache 125. Source and destination machines need not be connected by a network 108 or any other means, but instead, data may be migrated via any media capable of being written by the source platform and read by the destination platform or platforms. When used in a LAN or WAN networking environment, the computer 100 may be connected to the LAN through a network interface 196 or an adapter. When used in a WAN networking environment, the computer 100 typically includes a modem or other means for establishing communications over the WAN, such as the Internet or network 108. It will be appreciated that other means of establishing a communications link between the computers may be used.

In some examples, the cache encryption/decryption process may be loaded into main memory (RAM) 124 by software that is part of the application programs 150 or program modules 160, or by other means such as a flash chip. Once loaded in memory, the encryption/decryption process may be arranged to, in some examples, run continuously as a background process for the processor. In some examples the encryption/decryption process may be arranged to restart automatically after a sleep/hibernation event of the computer 100 or after a restart or when the computer 100 is next activated. Alternatively, an authorized user such as a user with administration privileges (that is, authorized to change security settings), may selectively activate/deactivate the data cache encryption/decryption process as needed. Further, the cache encryption/decryption process may be arranged to run periodically.

Once a determination to encrypt data has been made and a determination has not been made to terminate encryption (described more fully below), any suitable method for encrypting the data may be used. The actual native encryption routine used to encrypt the data in the cache may be the AES. Further, data that the process has already encrypted can be readily recognized so that it is not encrypted a second time.

Figure 2:
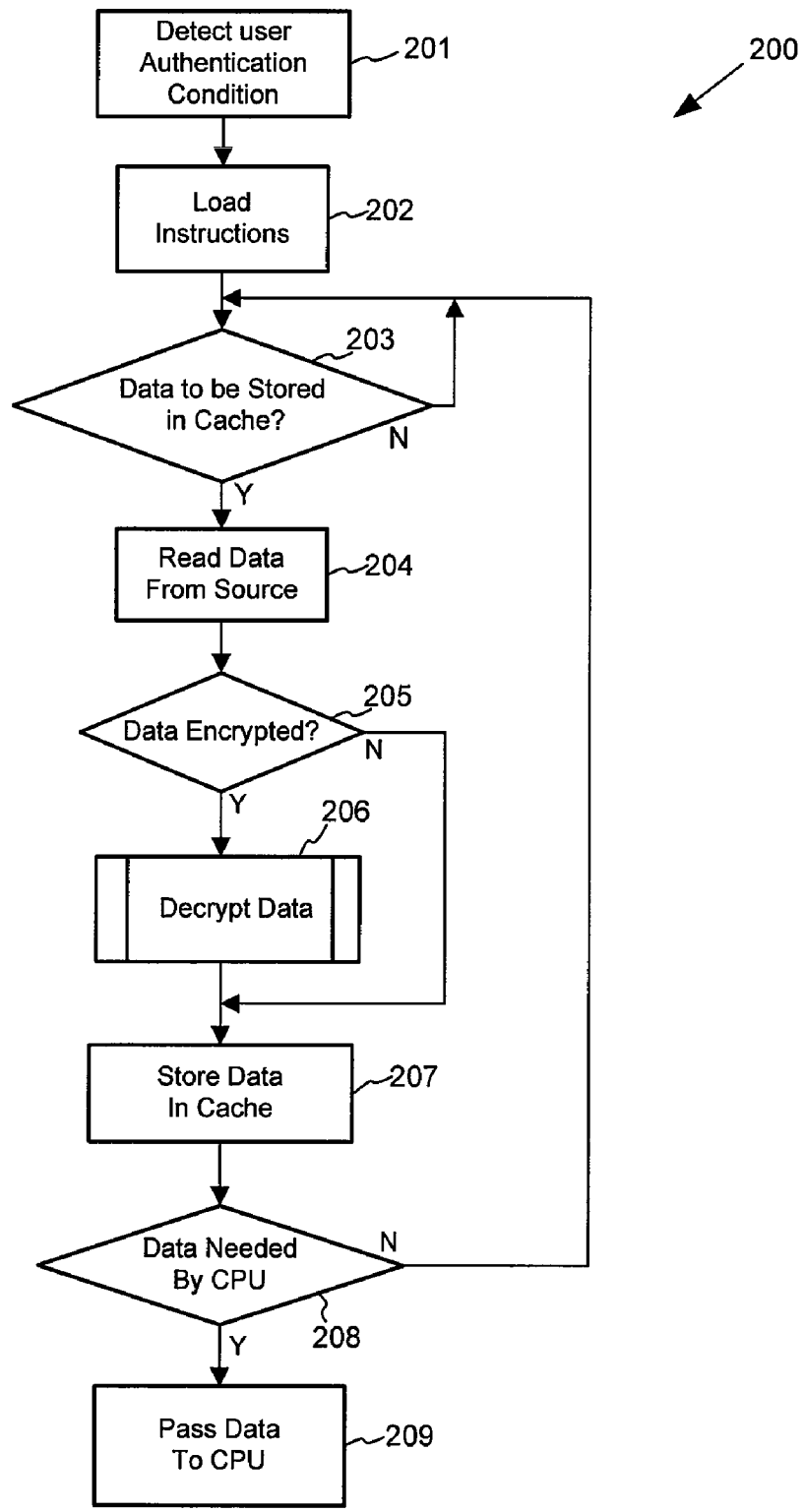
FIG. 2 is a flowchart showing an example of a process for storing data in a cache in encrypted form.

FIG. 2 is a flowchart showing an example of a process 200 for storing data in the cache 125 in unencrypted form in accordance with the present disclosure. Process 200 may be arranged to initiate one or more operations as illustrated by blocks 201-210. For some of the illustrated example process, it is assumed that: a processor is arranged to execute process 200, and data is transferred to a cache from a backing storage device or from some other similar location using some other separate process (e.g. a data prefetch process, a predictive data fetch process, a data cache hit/miss process, etc.).

The process may begin when a particular condition indicative of user authentication has been detected by the CPU 110 (block 201). Instructions may be loaded into the CPU 110 (block 202). Next, the process detects whether there is data to be stored in the cache 125 (block 203). If not, the process may repeat block 203 until data is present to be stored in the cache 125. The data may be loaded in the cache 125 by any suitable means such as in response to the load instructions 202 or when data is found to be missing from the cache 125 (i.e., a cache miss). If there is data to be stored in the cache 125, the process may read the data from its source, such as in the backing storage 130 (block 204). Next, the process determines whether an individual file or block of data that is to be stored in the cache 125 has been encrypted (block 205). If the data is encrypted, then the data is decrypted by the native decryption routine (block 206) before being stored in the cache 125 (block 207). In some embodiments, a data table or other status tracking mechanism may be used to track which files or blocks of data in the cache have been decrypted. Process 200 checks if the decrypted data stored in the cache 125 is needed by the CPU 110 (block 208). If the data is not needed by the CPU 110, then the data remains intact in the cache 125 and the process repeats, returning to monitoring for data that is to be added to the cache 125 (blocks 203-208). When it is determined at 208 that data stored in the cache 125 is needed by the CPU 110, the data is passed to the CPU (block 209). Process 200 may then return to monitoring the cache 125 (blocks 203, 204).

Figure 3:
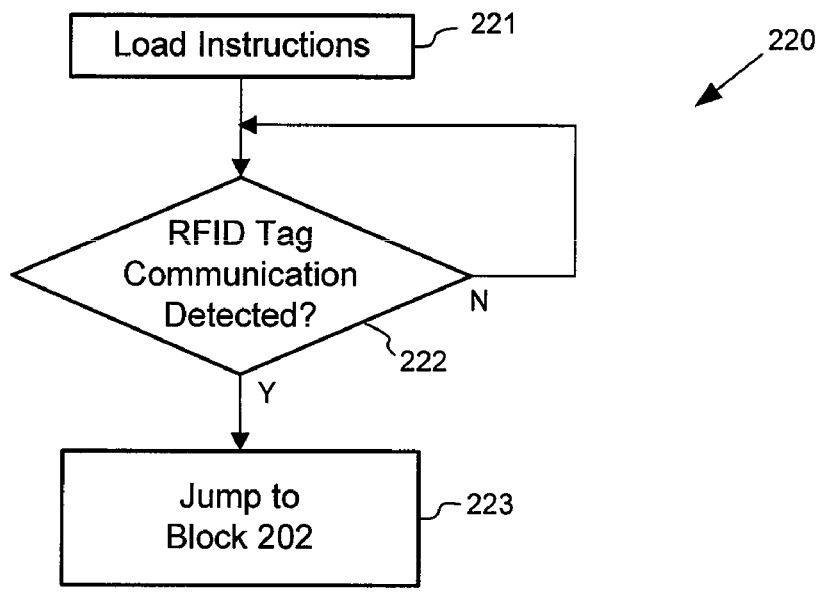
FIG. 3 is a flowchart showing an example of a process for detecting a particular condition indicative of user authentication in the process of FIG. 2.

FIG. 3 is a flowchart showing an example of a process 220 for performing the operations at block 201 (FIG. 2) of detecting a particular condition indicative of user authentication in accordance with the present disclosure. Process 220 may be arranged to initiate one or more operations as illustrated by blocks 221-223. The process 220 begins when instructions are loaded into the CPU 110 (block 221). The processor then determines whether communication with an RFID tag has been detected (block 222). If no RFID tag communication is detected, the process remains in a loop by returning to block 222. If communication with an RFID tag is detected, the process may return to block 202 (FIG. 2) where instructions may be loaded into the CPU 110 to perform the process shown in FIG. 2 (block 223).

Figure 4:
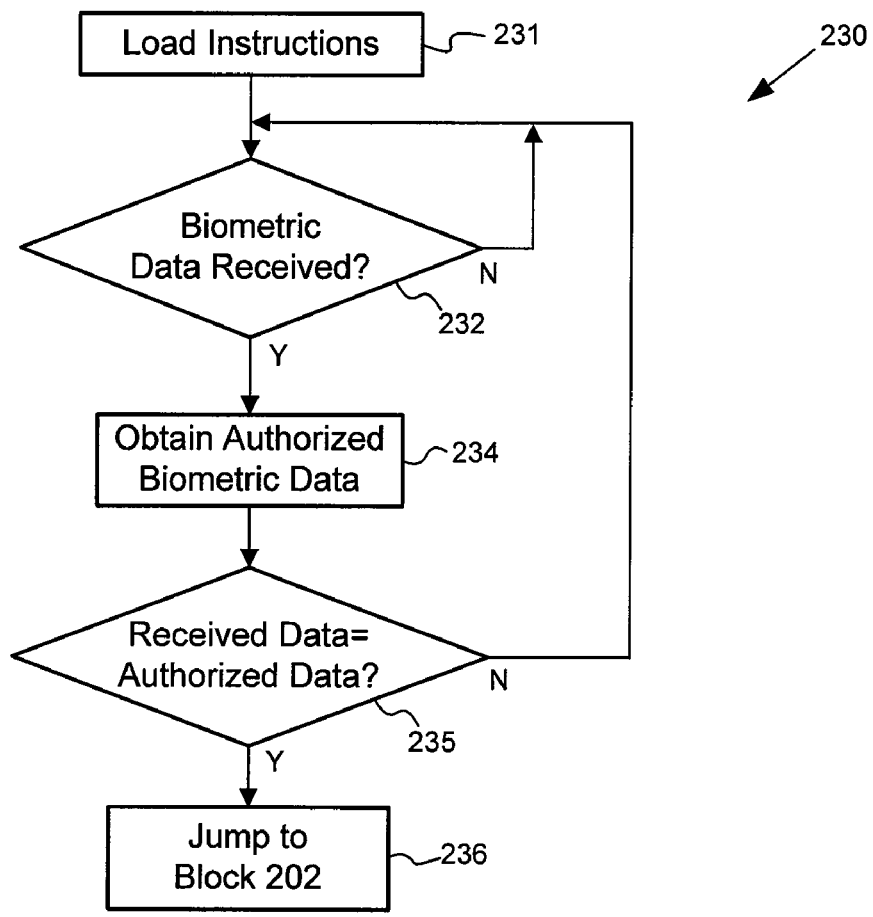
FIG. 4 is a flowchart showing another example of a process for detecting a particular condition indicative of user authentication in the process of FIG. 2.

FIG. 4 is a flowchart showing another example of another process 230 for performing the operations at block 201 (FIG. 2) of detecting a particular condition indicative of user authentication in accordance with the present disclosure. Process 230 may be arranged to initiate one or more operations as illustrated by blocks 231-236. The process 230 begins when instructions are loaded into the CPU 110 (block 231). Next, the processor may determine whether data from a biometric measurement device is received (block 232). The biometric data may be, for example, data from a thumbprint reader, a retinal scanner, or a functional magnetic resonance imaging device, to name a few. If data from the biometric measurement device have not been detected, the process may remain in a loop by returning to block 232. If biometric data is detected, the process 230 may obtain a list of biometric data from authorized users (block 234). The process 230 may then compare the received biometric data to the authorized biometric data (block 235). If the received biometric data is found in the list of authorized biometric data, the process may return to block 202 (FIG. 2) where instructions are loaded into the CPU 110 to perform the process shown in FIG. 2 (block 236). If not, the process may return to block 232 to detect any additional data from a biometric measurement device.

Figure 5:
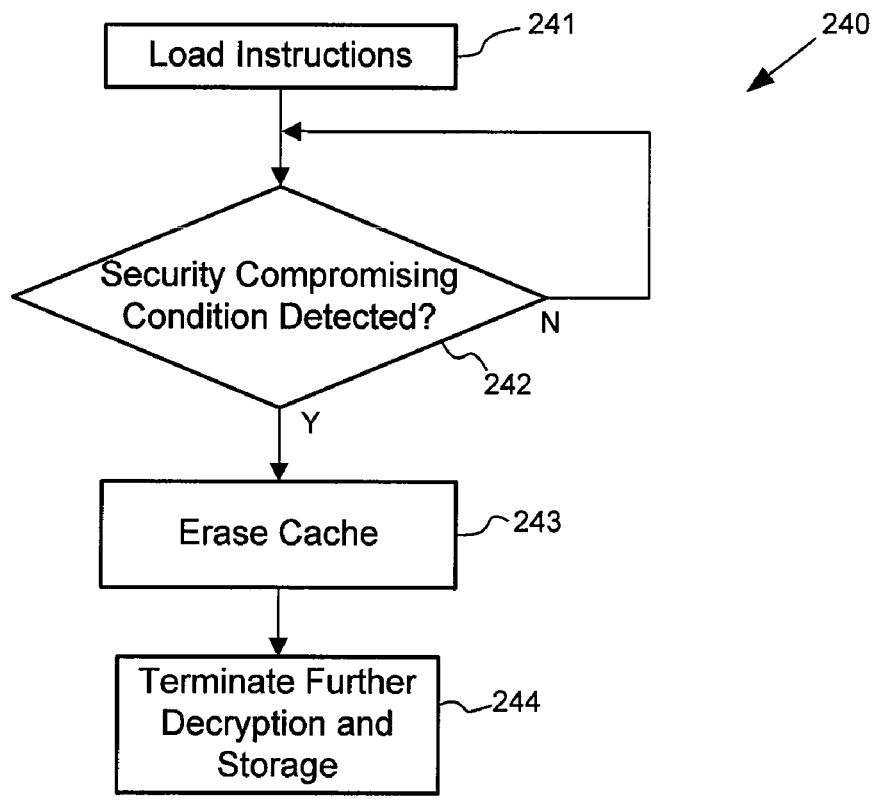
FIG. 5 is a flowchart showing an example of a process for terminating the encryption of data stored in a cache and erasing the encrypted data that has already been stored in the cache when a particular condition that may compromise the security of the data is detected.

FIG. 5 is a flowchart showing an example of a process 240 for terminating the storage of decrypted data in the cache 125 and erasing the decrypted data that has already been stored in the cache 125 when a particular condition that may compromise the security of the data has occurred, in accordance with the present disclosure. The process 240 shown in FIG. 5 may be used in combination with the process shown in FIG. 2 for storing data in the cache 125 in decrypted form or with some other process for storing data in the cache 125 in decrypted form. Process 240 may be arranged to initiate one or more operations as illustrated by blocks 241-244.

Process 240 may begin when instructions are loaded into the CPU 110 (block 241). Next, a determination may be made whether a particular condition that may compromise the security of data stored in the cache 125 has occurred (block 242). If not, the process 240 may remain in a loop by returning to block 242. However, if a particular condition that may compromise data security was detected at block 242, at least the portion of the cache 125 that is storing data that has been decrypted may be erased (block 243). In some embodiments only such data are erased, and data that was never protected by being encrypted are not erased. In some embodiments, a data table or other status tracking mechanism may be used to determine which portions of cache 125 are storing data that has been decrypted. After erasing at least the decrypted data in the cache 125 at block, the decryption of additional data may be terminated (block 244).

Figure 6:
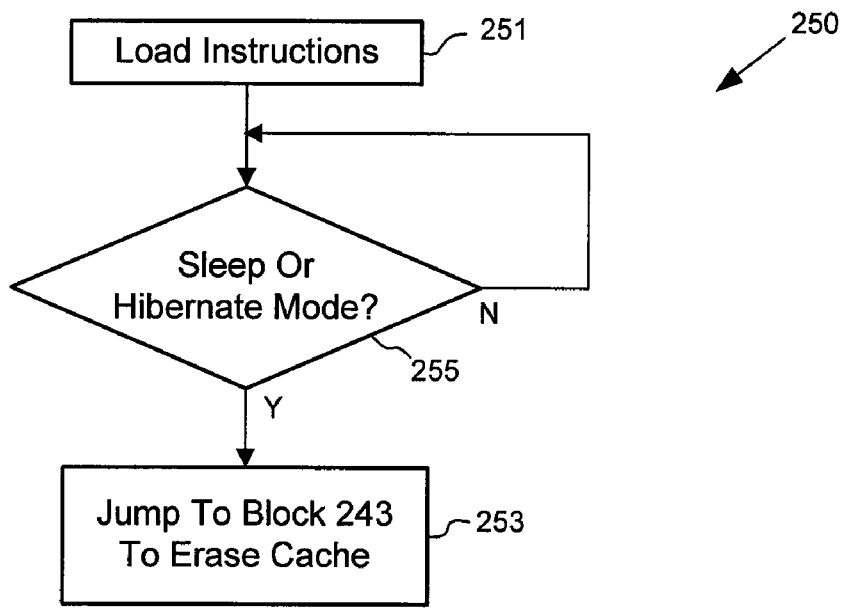
FIG. 6 is a flowchart showing an example of a process for detecting a particular condition that may compromise the security of data stored in the cache in the process of FIG. 5.

FIG. 6 is a flowchart showing an example of a process 250 for performing the operations at block 242 (FIG. 5) of detecting a particular condition that may compromise the security of data stored in the cache 125, in accordance with the present disclosure. Process 250 may be arranged to initiate one or more operations as illustrated by blocks 251-253. The process may begin when instructions are loaded into the CPU 110 (block 251). Next, a determination is made whether the computer system has entered the sleep or hibernate mode (block 252). If not, the process remains in a loop by returning to block 252 where it continues to detect if the computer system has entered the sleep or hibernate mode. If block 252 detects that the computer has entered the sleep or hibernate mode, the process may jump to block 243 (FIG. 5) where the cache 125 may be erased (block 253).

Figure 7:
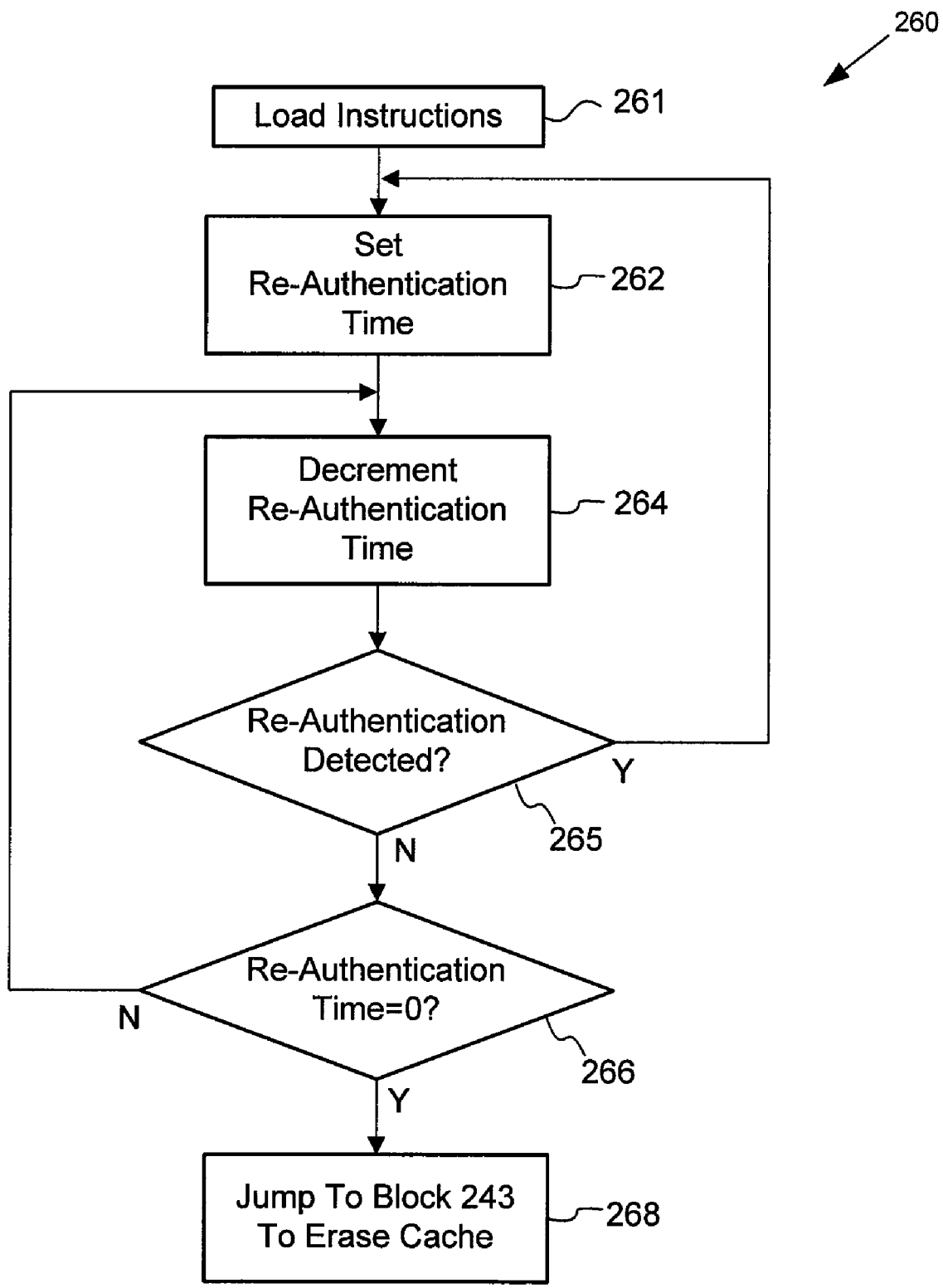
FIG. 7 is a flowchart showing another example of a process for detecting a particular condition that may compromise the security of data stored in the cache in the process of FIG. 5.

FIG. 7 is a flowchart showing another example of a process 260 for performing the operations at block 242 (FIG. 5) of detecting a particular condition that may compromise the security of data stored in the cache 125, in accordance with the present disclosure. Process 260 may be arranged to initiate one or more operations as illustrated by blocks 261-268. The process may begin when instructions are loaded into the CPU 110 (block 261). Next, a re-authentication time may be set (block 262) to a specific period of time by which re-authentication must occur. The re-authentication may occur by any means, including through RFID card data, biometric security device, a password, and a smartcard reader data, to name a few. The re-authentication time may then be decremented (block 264). Next, a determination may be made whether re-authentication has occurred (block 265) since the last time the re-authentication time was decremented at block 264. If block 265 determines that re-authentication has occurred, the process may returns to block 262 where the re-authentication time is reset. If re-authentication has not occurred, the process may determine whether the re-authentication time has been decremented to zero (block 266). If not, the process may return to block 264 to again decrement the re-authentication time. If at block 266 the process 260 determines that the re-authentication time has been decremented to zero, the process may jump to block 243 (FIG. 5) where the cache 125 may be erased (block 268).

Figure 8:
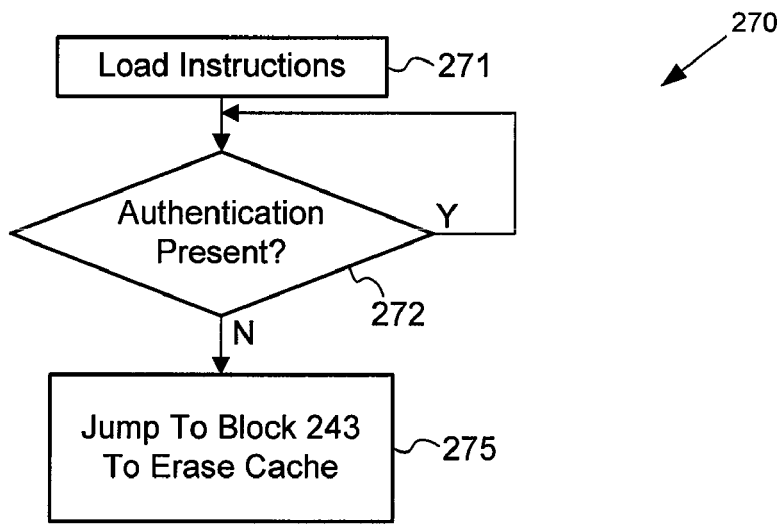
FIG. 8 is a flowchart showing another example of a process for detecting a particular condition that may compromise the security of data stored in the cache in the process of FIG. 5.

FIG. 8 is a flowchart showing still another example of a process 270 for performing the operations at block 241 (FIG. 5) of detecting a particular condition that may compromise the security of data stored in the 125, in accordance with the present disclosure. Process 270 may be arranged to initiate one or more operations as illustrated by blocks 271-275. The process 270 may again begins when instructions are loaded into the CPU 110 (block 271). Next, a determination may be made whether an authentication indication is still present (block 272). The authentication indication may be made by any means by which authentication originally occurred, such as where authentication originally occurred from data received from an RFID tag. However, the authentication indication may also be made by means different from the means by which authentication originally occurred. For example, where authentication originally occurred by manual entry of a password to a server through a WiFi domain or network connection, the authentication indication can be the continued communication of the computer with the WiFi domain or the continued connection of the computer to a network. If at block 272 the process 270 determines that an authentication indication is still present, the process may remain in a loop by returning to block 272. However, if at block 272 the process 270 determines that an authentication indication has been lost, such as communication with an RFID tag, WiFi domain or network termination, for example, the process 270 may jump to block 243 (FIG. 5) where the cache 125 may be erased (block 275).

Figure 9:
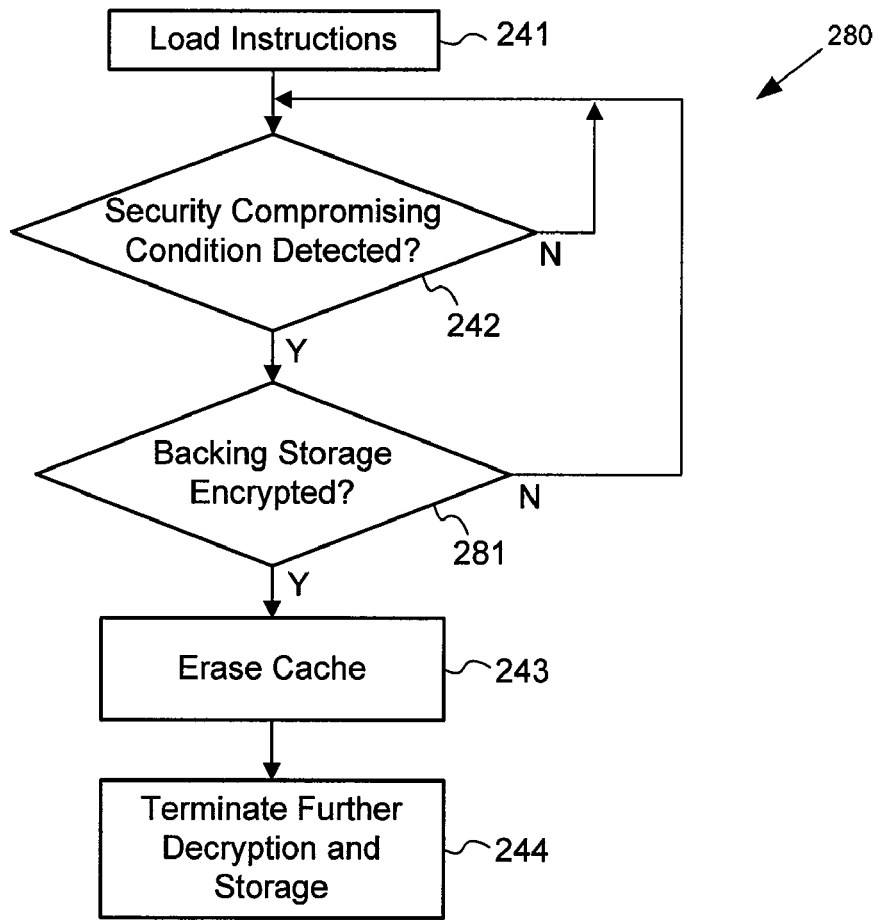
FIG. 9 is a flowchart showing still another example of a process for detecting a particular condition that may compromise the security of data stored in the cache in the process of FIG. 5.
Figure 10:
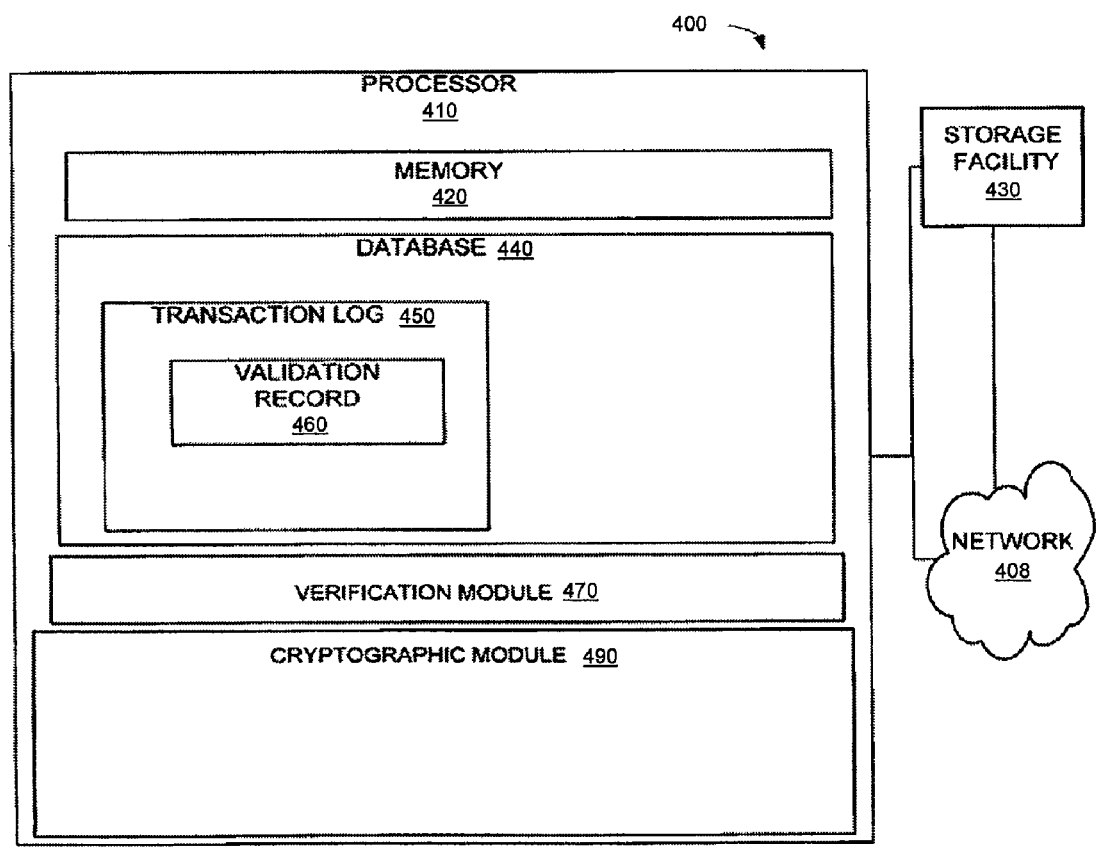
FIG. 10 is a block diagram of a special purpose computer system including a processor configured for selectively securing data and/or erasing secure data caches responsive to security compromising conditions.
Figure 5:
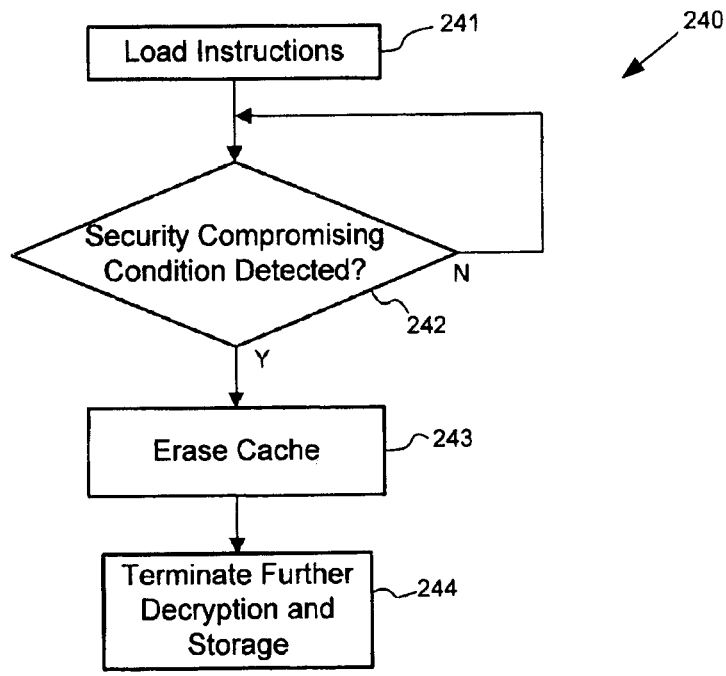
Figure 6:
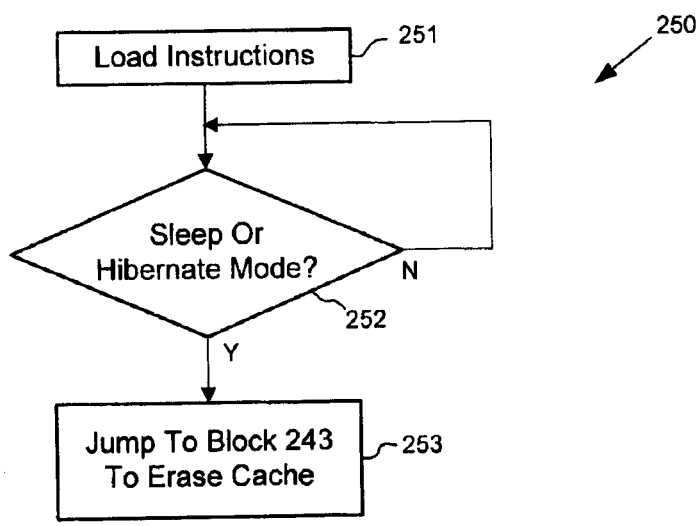

FIG. 9 is a flowchart showing another example of a process 280 for terminating the storage of decrypted data in the cache 125 and erasing the decrypted data that has already been stored in the cache 125 when a particular condition that may compromise the security of the data has occurred, in accordance with the present disclosure. Process 280 may be arranged to initiate one or more operations as illustrated by blocks 241-244 and 281. The process 280 shown in FIG. 9 is very similar to the process 240 shown in FIG. 5. Therefore, in the interest of clarity and brevity, the same reference numerals have been used for the same blocks, and an explanation of them will not be repeated. The process 280 of FIG. 9 differs from the process 240 of FIG. 5 by making the termination of continued decrypted data storage and the erasing of the decrypted data stored in the cache 125 conditional on whether the corresponding data stored in the backing storage is encrypted. With reference to FIG. 9, if block 242 detects a particular condition that may compromise data security, a determination may be made about whether the data stored in the backing storage is encrypted (block 281). In order for the subroutine to detect encrypted data encrypted by a backing storage device protection processes, a backing storage device may report directly if it is encrypted. The subroutine may alternatively use an encryption detection method such as in the concurrent patent application US 410247, herein incorporated by reference in its entirety. This encryption detection method involves first reading the data from a data source, such as a backing storage device. Next the method calculates a property of the data, such as their Shannon entropy or compressibility, and compares the calculated value with a threshold entropy or compressibility value that indicates that the data are encrypted. An additional sorting mechanism can be performed prior to the calculation step, in which, if the data are stored in a file structure, data files of types known to be encrypted can be indicated as such without further processing. If at block 281 the process 280 determines that the data stored in the backing storage has not been encrypted, the process 280 may remain in a loop by returning to block 242. If at block 281 the process 280 determines that the data stored in the backing storage is encrypted, at least the portion of the cache 125 storing the corresponding decrypted data may be erased (block 243) and the process of continuing to store decrypted data in the cache 125 may be terminated (block 244). In one particular example, as shown in the block diagram of FIG. 10, a special purpose computer system 400 may include a processor 410 configured for performing an embodiment of a method for selectively securing data and/or erasing data caches responsive to security compromising conditions, in accordance with the present disclosure. In other embodiments, various steps or portions of various steps of the method may be performed outside of the processor 410.

The computer system 400 may include a system memory 420, which may be RAM, ROM, flash memory, or some other type of memory. The computer system 400 may also includes a database 440, which can be any means for storing data including a disk drive, ROM, and flash memory, to name a few. The database 440 may constitute the backing storage described above where the data to be stored may be cached. The database 440 may include a transaction log 450 that stores data relating to user authentication. For example, the transaction log 450 may include a validation record 460 identifying individuals who are authorized to access the computer system 400. The computer system 400 may also includes a verification module 470 and may perform a function of verifying that authentication matches data stored in the validation record 460. The transaction log 450 and verification module 470 may communicate with the processor 410 to perform some of the functions previously described. The computer system 400 may be coupled to a network 408, which may in turn be coupled to a storage facility 430. The storage facility 430 may also constitute the backing storage described above where the data to be stored may be cached.

FIG. 11 shows an example of any computer readable medium 502 that may be part of a computer program product 500 to configure the computer 100 or 400 to detect conditions indicating that the security of data stored in a data cache my be compromised and to erase the stored data in response to detecting the condition, arranged in accordance with the present disclosure. The computer readable medium 502 may be arranged to store instructions 504, which may be arranged to configure the computer 100 or 400 to perform all or some of the processes previously described. These instructions may include, for example, an executable instruction 506 for configuring the computer 100 or 400 to detect a condition indicating that the security of data stored in a data cache may be compromised. These conditions may be, for example, the entry of the computer 100 or 400 into a sleep or hibernate mode, failure of a user to provide re-authentication within a particular time limit of initial authentication or a prior re-authentication, loss of contact by the computer 100 or 400 with an authenticating RFID tag, loss of communication with a WiFi network with which the processing unit has been communicating, or disconnection from a network with which the processing unit has been connected, to name of few. The executable instructions stored in the computer readable medium 502 may also include an executable instruction 508 to configure the processing unit to erase the data stored in the cache in response to detecting the condition.

The foregoing describes various examples of cache data encryption. Specific examples of methods and systems of cache data encryption described are for illustration only and are not intended to be limiting. The described data encryption system and method generally relate to storing unencrypted data in a data cache when a particular condition indicative of user authentication or data security has occurred, and terminating the storage of unencrypted data and erasing the unencrypted data stored in data cache when a particular condition that may compromise the security of the data has occurred. For example, the described systems and methods may erase the cache data if a sleep/hibernation sequence is detected or if a particular period of time has elapsed since secure data storage has begun or since user authentication has occurred. The described systems and methods may erase the data stored in the responsive to indications that an authorized user no longer has control of the computer system in which disk caching is occurring, such as if communication with an RFID user authentication tag of the computer leaves a particular WiFi domain or a particular network connection or is no longer detected as being in the same proximity of an authenticated user.

Examples are also provided of computer-accessible mediums having stored thereon computer-executable instructions for data cache encryption and decryption when the executable instructions are executed by a processing unit. The described instructions may configure the processing unit to decrypt data stored in a data cache when a particular condition indicative of user authentication or data security has occurred, and to terminate the storage of unencrypted data and erase the unencrypted data stored in data cache when a particular condition that may compromise the security of the data has occurred.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. For example, if a user determines that speed and accuracy are paramount, the user may opt for a mainly hardware and/or firmware vehicle; if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Although the present invention has been described with reference to the disclosed embodiments, persons skilled in the art will recognize that changes may be made in form and detail without departing from the invention. Such modifications are well within the skill of those ordinarily skilled in the art. Accordingly, the invention is not limited except as by the appended claims.

We claim:

1. A method for processing from a cache data stored in a backing storage device in encrypted form using a data processing device that includes a processor, the method comprising:
    detecting a condition indicative of user authentication;
    reading data from the backing storage when the condition indicative of user authentication is detected;
    evaluating the data read from the backing storage to identify the data as either encrypted or unencrypted;
    unencrypting the data to provide unencrypted data when the data read from the backing storage is identified as being encrypted; and
    storing the unencrypted data in the cache.

2. The method of claim 1, further comprising:
    determining when the encrypted data stored in the backing storage is needed for use by the processor in the data processing system;
    decrypting the encrypted data stored in the backing storage device to generate decrypted data when the encrypted data stored in the backing storage device is determined to be needed for use by the processor;
    storing the decrypted data in the cache; and
    passing the decrypted data from the cache to the processor.

3. The method of claim 1 wherein detecting the condition indicative of user authentication comprises:
    obtaining the data identifying the user of the data processing device;
    determining when the obtained data identifying the user matches authorization data identifying an authorized user; and
    registering the condition indicative of user authentication when the obtained data identifying the user is determined to match the authorization data identifying an authorized user.

4. The method of claim 1, further comprising:
    detecting a condition indicating that the security of the data stored in the cache may be compromised; and
    erasing at least some of the data stored in the cache when the detected condition indicates that the security of the data stored in the cache may be compromised.

5. The method of claim 4 wherein the erasing at least some of the data stored in the cache when the detected condition indicates that the security of the data stored in the cache may be compromised comprises erasing all of the data stored in the cache.

6. The method of claim 4 wherein the erasing at least some of the data stored in the cache when the detected condition indicates that the security of the data stored in the cache may be compromised comprises erasing only the unencrypted data stored in the cache that corresponds to data that was stored in the backing storage device in encrypted form.

7. The method of claim 1, further comprising:
    detecting a condition indicating that the security of the data stored in the cache may be compromised; and
    terminating further storage of decrypted data in the cache when the detected condition indicates that the security of the data stored in the cache may be compromised.

8. The method of claim 1, further comprising:
    detecting the condition indicating that the security of data stored in the cache may be compromised;
    monitoring a time lapse from when the condition indicating that the security of data stored in the cache may be comprised was detected; and
    determining when the time lapse exceeds a particular authorization time limit.

9. The method of claim 8, further comprising:
    detecting a re-authentication from the user of the data processing device; and
    resetting the time lapse from when the condition indicative of user authentication was detected when the re-authentication from the user is detected.

10. A method of protecting unencrypted data stored in a cache on a data processing device, comprising:
    detecting a condition indicating that the security of data stored in the cache may be compromised; and
    erasing at least some of the data stored in the cache when the condition indicating the security of data stored in the cache is detected as compromised.

11. The method of claim 10 wherein detecting the condition indicating that the security of data stored in the cache may be compromised comprises detecting when the data processing device has entered a sleep or hibernate mode.

12. The method of claim 10 wherein detecting the condition indicating that the security of data stored in the cache may be compromised comprises detecting that communication with the data processing device in a wireless domain has been lost.

13. The method of claim 10 wherein detecting the condition indicating that the security of data stored in the cache may be compromised comprises detecting that the data processing device has lost a connection to a network or proximity to a user.

14. The method of claim 10 wherein the erasing of the data stored in the cache comprises:
   determining when a portion of the data stored in the backing storage is encrypted; and
   conditioning the erasing of the decrypted data stored in the cache on the determination that the corresponding portion of the data stored in the backing storage is encrypted.

15. A data processing system responsive to input from a user, the data processing system comprising:
   an authentication device for generating authentication data associated with user input;
   a cache to store data; and
   a data processor arranged to decrypt data to be stored in the cache, wherein the data processor is configured to:
      detect a condition indicative of user authentication in response to the authentication data;
      receive data;
      determine when a portion of the received data is encrypted;
      when the condition indicative of user authentication is detected, decrypt the portion of received data that is determined to be encrypted to generate decrypted data; and
      store the decrypted data in the cache.

16. The data processing system of claim 15 wherein the authentication device comprises one of a radio frequency identification reader, a thumbprint scanner, or a retinal scanner.

17. The data processing system of claim 15 wherein the data processor is further configured to:
   identify the received data that is unencrypted; and
   storing the already unencrypted data in the cache.

18. The data processing system of claim 15 wherein the data processor is further configured to:
   detect a condition indicating that the security of data stored in the cache may be compromised; and
   erase the unencrypted data stored in the cache after the condition indicating that the security of data stored in the cache may be compromised is detected.

19. A data processing system comprising:
   a cache for storing data; and
   a data processor arranged in cooperation with the cache, wherein the data processor is configured to:
      detect a condition indicating that the security of data stored in the cache may be compromised; and
      erase at least a portion of the data stored in the cache after the condition indicating that the security of data stored in the cache may be compromised is detected.

20. A computer accessible medium having stored thereon computer executable instructions to be executed by a processor for data cache encryption and decryption, wherein the computer executable instructions are configured to enable the processor to:
   detect a condition indicating that the security of data stored in the cache may be compromised; and
   erase at least a portion of the data stored in the cache after the condition indicating that the security of data stored in the cache may be compromised is detected.

* * * * *

UNITED STATES PATENT AND TRADEMARK OFFICE
CERTIFICATE OF CORRECTION

| | |
|---|---|
| PATENT NO. | : 8,352,679 B2 |
| APPLICATION NO. | : 12/432599 |
| DATED | : January 8, 2013 |
| INVENTOR(S) | : Wolfe et al. |

It is certified that error appears in the above-identified patent and that said Letters Patent is hereby corrected as shown below:

In the Drawings

In Fig. 6, Sheet 4 of 8, delete Tag "255" and insert Tag -- 252 --, therefor.

In the drawings, figs. 5 & 6 should be replaced with the corrected figs. 5 & 6 as shown on the attached pages.

In the Specification

In Column 1, Line 9, delete "theft" and insert -- theft. --, therefor.

In Column 4, Line 62, delete "201-210." and insert -- 201-209. --, therefor.

In Column 6, Line 25, delete "block," and insert -- block 243, --, therefor.

In Column 8, Line 37, delete "my" and insert -- may --, therefor.

In the Claims

In Column 12, Line 52, in Claim 8, delete "comprised" and insert -- compromised --, therefor.

Signed and Sealed this
Nineteenth Day of November, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,352,679 B2  Page 1 of 2
APPLICATION NO. : 12/432599
DATED : January 8, 2013
INVENTOR(S) : Wolfe et al.

It is certified that error appears in the above-identified patent and that said Letters Patent is hereby corrected as shown below:

Claims

In Column 11, Line 60, in Claim 1, delete "storage" and insert -- storage device --, therefor.

In Column 11, Line 62, in Claim 1, delete "storage" and insert -- storage device --, therefor.

In Column 11, Line 65, in Claim 1, delete "storage" and insert -- storage device --, therefor.

In Column 12, Line 3, in Claim 2, delete "storage" and insert -- storage device --, therefor.

In Column 12, Line 14, in Claim 3, delete "the data identifying the user" and insert -- data identifying a user --, therefor.

In Column 12, Line 21, in Claim 3, delete "identifying an" and insert -- identifying the --, therefor.

In Column 12, Line 24, in Claim 4, delete "the security" and insert -- a security --, therefor.

In Column 12, Line 42, in Claim 7, delete "that the" and insert -- that a --, therefor.

In Column 12, Line 48, in Claim 8, delete "the condition indicating that the" and insert -- a condition indicating that a --, therefor.

In Column 12, Line 56, in Claim 9, delete "the user" and insert -- a user --, therefor.

In Column 12, Line 63, in Claim 10, delete "the security" and insert -- a security --, therefor.

In Column 13, Line 16, in Claim 14, delete "erasing" and insert -- erasing at least some --, therefor.

Signed and Sealed this
Twenty-first Day of June, 2016

Michelle K. Lee
*Director of the United States Patent and Trademark Office*

CERTIFICATE OF CORRECTION (continued)
U.S. Pat. No. 8,352,679 B2

Claims

In Column 13, Lines 18-19, in Claim 14, delete "the backing storage" and insert -- a backing storage device --, therefor.

In Column 13, Line 20, in Claim 14, delete "the erasing of the decrypted" and insert -- erasing of decrypted --, therefor.

In Column 13, Line 21, in Claim 14, delete "the corresponding" and insert -- a corresponding --, therefor.

In Column 13, Line 22, in Claim 14, delete "storage" and insert -- storage device --, therefor.

In Column 13, Line 37, in Claim 15, delete "portion of" and insert -- portion of the --, therefor.

In Column 14, Line 11, in Claim 17, delete "storing" and insert -- store --, therefor.

In Column 14, Line 13, in Claim 18, delete "the security" and insert -- a security --, therefor.

In Column 14, Line 15, in Claim 18, delete "the unencrypted" and insert -- unencrypted --, therefor.

In Column 14, Line 22, in Claim 19, delete "the security" and insert -- a security --, therefor.

In Column 14, Line 32, in Claim 20, delete "the security" and insert -- a security --, therefor.

In Column 14, Line 33, in Claim 20, delete "the cache" and insert -- a cache --, therefor.